United States Patent [19]
Hanson

[11] 3,915,031
[45] Oct. 28, 1975

[54] DUAL MODE DRIVE DIFFERENTIAL MECHANISM

[75] Inventor: Edwin E. Hanson, Peoria, Ill.

[73] Assignee: Caterpillar Tractor Co., Peoria, Ill.

[22] Filed: Oct. 24, 1974

[21] Appl. No.: 517,775

[52] U.S. Cl. ............... 74/710.5; 74/714; 74/650; 74/720
[51] Int. Cl.².. F16H 1/44; F16H 1/42; F16H 35/04; F16H 47/00
[58] Field of Search .......... 74/710.5, 714, 650, 677, 74/720; 180/44, 24.09

[56] References Cited
UNITED STATES PATENTS

| | | | |
|---|---|---|---|
| 2,468,107 | 4/1949 | Powell | 74/650 |
| 3,528,323 | 9/1970 | Kamlukin | 74/710.5 |
| 3,653,279 | 4/1972 | Sebern | 74/710.5 |

Primary Examiner—Samuel Scott
Assistant Examiner—P. S. Lall
Attorney, Agent, or Firm—Phillips, Moore, Weissenberger, Lempio & Strabala

[57] ABSTRACT

A differential mechanism suitable for such purposes as coupling the engine of the vehicle to opposite drive wheels utilizes a hydrodynamic fluid coupling and a planetary gear arrangement to provide two different modes of differential action for use at different vehicle speeds. In a first mode for use at low speeds, a mechanical differential action is modified by torque regeneration through the fluid coupling to limit slip of one wheel relative to the other with the slip limiting effect being proportional to the difference of rotational speed of the two wheels. In the second or high speed mode of operation, brought about by discharging the fluid coupling, a purely mechanical differential action is realized.

8 Claims, 3 Drawing Figures

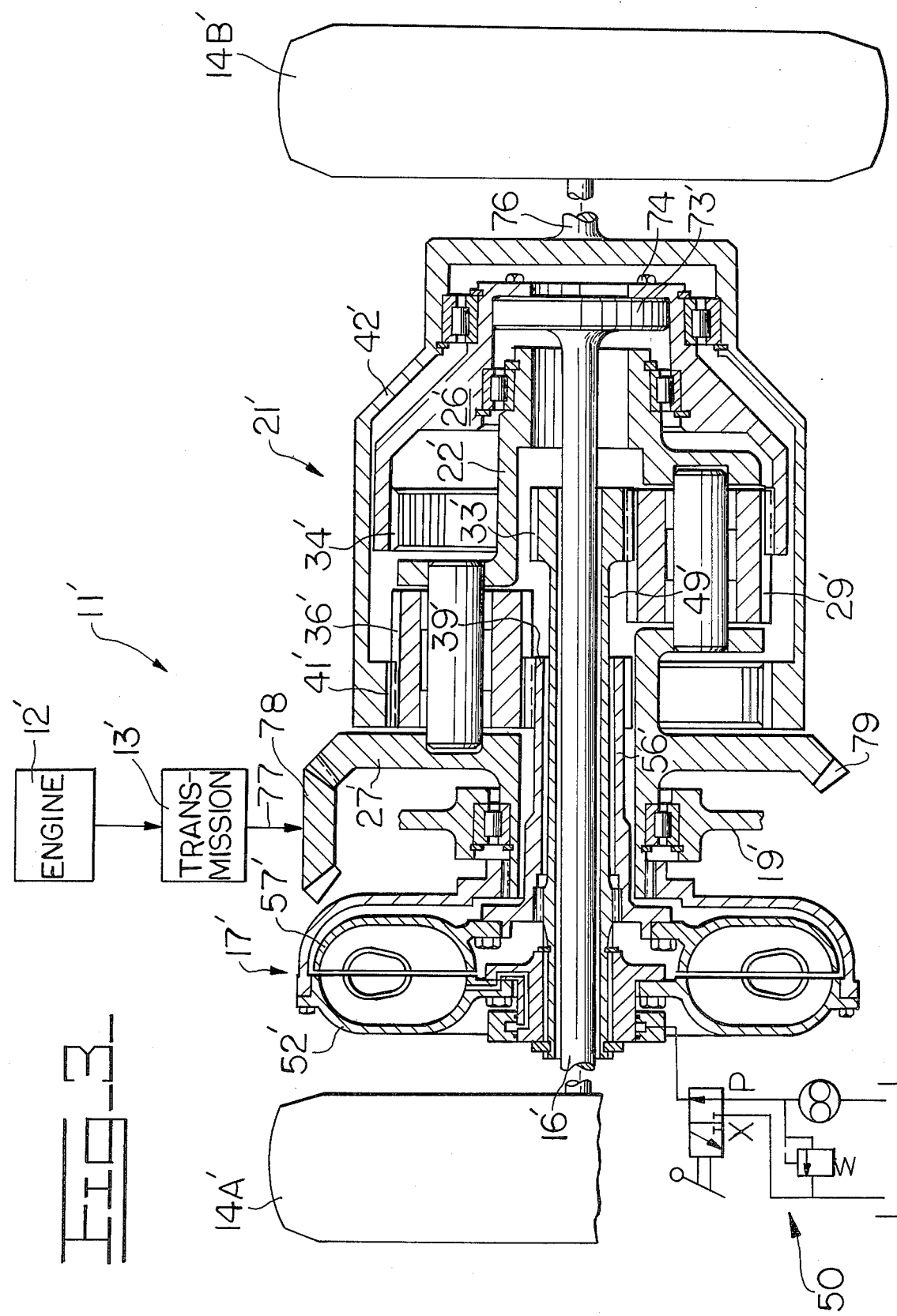

DUAL MODE DRIVE DIFFERENTIAL MECHANISM

BACKGROUND OF THE INVENTION

Where two rotatable elements are driven from a single power source a differential mechanism may be needed to enable one of the driven elements to turn at a different rate than the other if necessary. Coupling a single engine to opposite drive wheels of a vehicle is the most well known usage for differential mechanisms and for convenience of description, the invention will be hereinafter discussed with reference to this usage but it should be understood that the invention is equally applicable to other rotary systems requiring a differential action.

The commonest form of conventional differential mechanism has an arrangement of bevel gears providing a purely mechanical power path. One problem in this conventional mechanism is that if one drive wheel of a vehicle loses traction then the normal division of torque between the two drive wheels is disrupted in an adverse manner. The slipping wheel rapidly accelerates while only a limited amount of torque is delivered to the non-slipping wheel. With one drive wheel spinning and the other receiving only limited torque, it is difficult to regain traction and stalling of the vehicle is very likely to occur.

To reduce the incidence of stalling from this cause in vehicles which may be operated under conditions conducive to a loss of wheel traction, so-called "limited slip" differentials have heretofore been devised. These include additional mechanism for diverting torque from a slipping to a non-slipping wheel when the rotational speed of the former greatly exceeds that of the latter. As heretofore constructed, these purely mechanical limited slip differentials have been undesirably complex and have not been fully effective with respect to delivering a desirably high proportion of the engine torque to the non-slipping wheel under extreme conditions.

A more efficient differential action has heretofore been provided by combining hydrodynamic fluid coupling devices with a differential gearing system of the planetary type. Prior U.S. Pat. No. 3,653,279 issued Apr. 4, 1972 to James R. Sebern and entitled DIFFERENTIAL FLUID COUPLING DRIVE discloses a differential mechanism in which two fluid drive couplings are used in conjunction with a planetary gear set and a clutch to provide a dual mode of differential action. At low speeds, each drive wheel is coupled to the engine somewhat independently of the other through an indiviual one of the fluid couplings. Because of the slip capabilities and torque conversion effect of such fluid couplings, one wheel may turn at a different rate from the other wheel but this is increasingly inhibited by the torque converter action as the relative difference in wheel speeds increases. In the other mode of operation at higher vehicle speeds, the planetary gear provides an essentially mechanical differential action but with the added feature that spinning of one wheel relative to the other is inhibited to an extent by the fluid couplings.

In the mechanism of this prior U.S. Pat. No. 3,653,279, two fluid couplings and a clutch are required. Further, in the low speed mode of operation, a true mechanical differential action is not present but instead a similar effect is simulated through the use of fluid couplings. Owing to the presence of fluid couplings in the primary power path, this low speed mode of operation differs from that of a purely mechanical differential insofar as a speed reduction at one wheel does not necessarily force a corresponding speed increase at the other wheel. With fluid couplings in the primary power path it is at least theoretically possible for both wheels to slow down or become stationary without stalling the engine. This soft or slippable drive system may be desirable under some operating conditions but undesirable under others.

SUMMARY OF THE INVENTION

This invention provides an improved differential mechanism utilizing fluid drive and planetary gearing to selectively offer two modes of differential action. In both modes of operation any speed reduction of one output is matched by a corresponding speed increase at the other output in the manner of a conventional purely mechanical differential but in one mode the fluid coupling provides a torque regenerative action to inhibit spinning of one wheel relative to the other to a degree which increases in proportion to the speed difference of the two outputs. Thus, in the last mentioned mode of operation, much more torque is applied to a non-slipping wheel than is the case with a conventional mechanical differential. In a preferred form, the invention requires only a single fluid coupling device and no clutches or brakes are needed for controlling the associated planetary gearing for the purposes described above. Also, in a preferred form, switching from one mode of operation to the other is accomplished by selectively charging or draining the fluid coupling.

Accordingly, it is an object of this invention to provide a compact and efficient differential mechanism capable of two different modes of operation including the equivalent of a standard mechanical differential mode and, in addition, a limited slip mode with a torque regenerating action provided by fluid drive means, wherein the branched primary power path is essentially mechanical in both modes of operation but is supplemented in one mode by a fluid path for transferring torque between the branches.

The invention together with further objects and advantages thereof will best be understood by reference to the following description of preferred embodiments taken in conjunction with the accompanying drawings.

BRIEF DESCRIPTION OF THE DRAWINGS

In the accompanying drawings:

FIG. 3 is an axial section view of another embodiment of the differential mechanism which is adapted to be disposed in essentially coaxial relationship with the rear axle structure of a vehicle.

DESCRIPTION OF THE PREFERRED EMBODIMENTS

Figure 1:
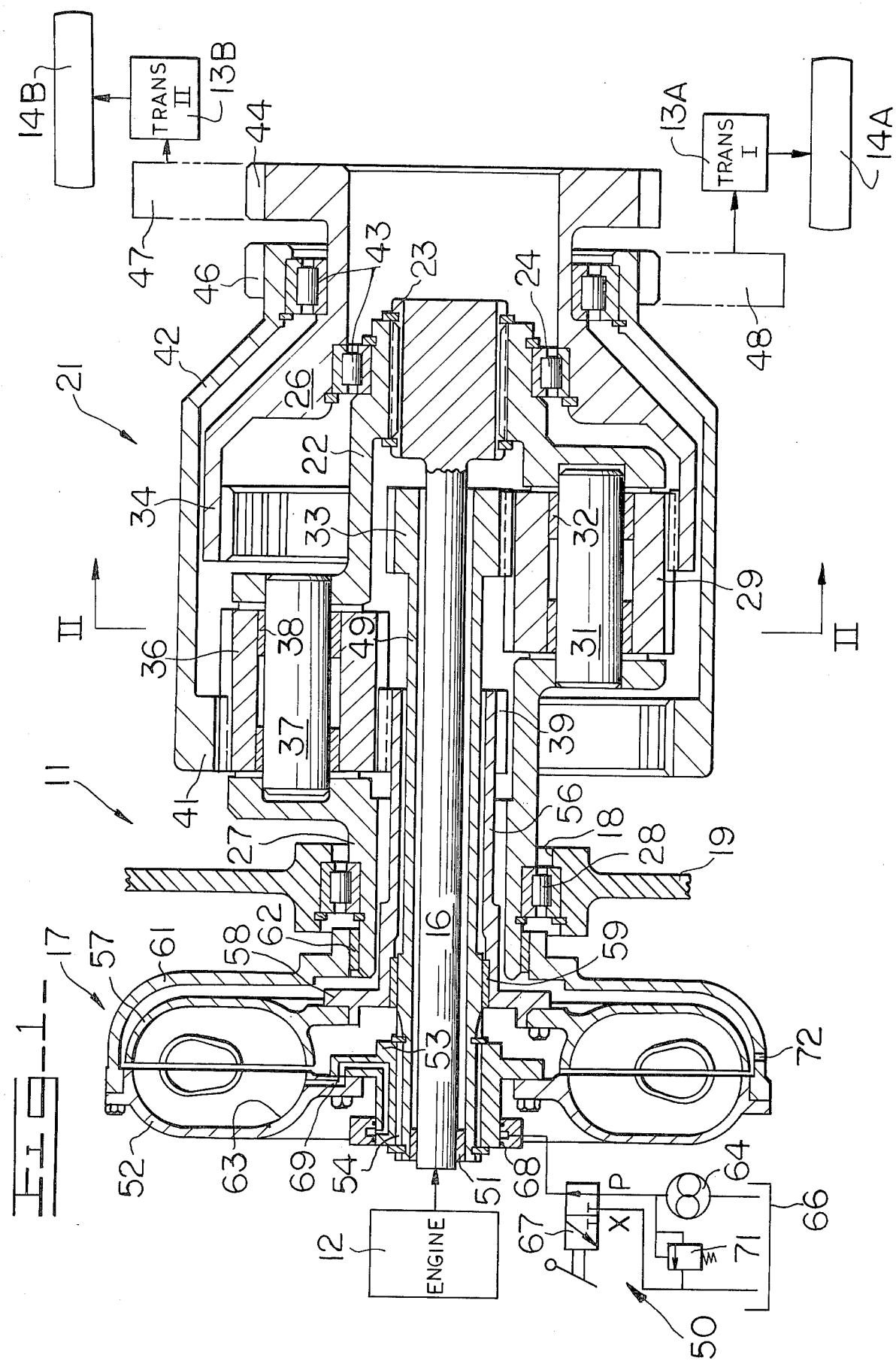
FIG. 1 is an axial section view of a differential mechanism embodying the invention.
Figure 2:
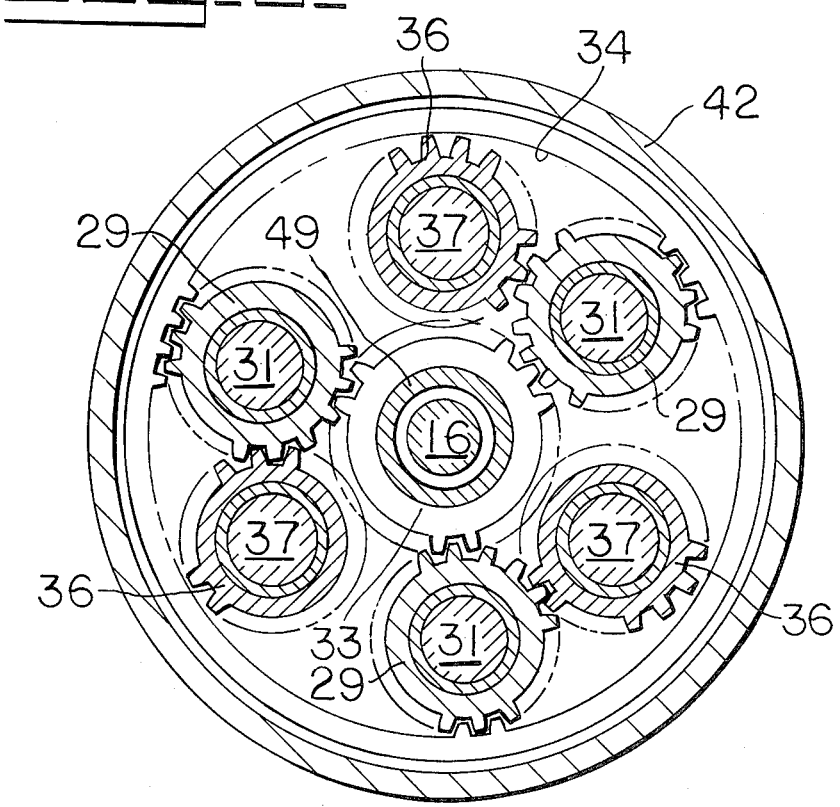
FIG. 2 is a cross-section view of the planetary gearing portion of the differential mechanism of FIG. 1 taken along line II—II thereof.

Referring initially to FIGS. 1 and 2 of the drawings in conjunction, there is shown a differential mechanism 11 of a form particularly adapted for use in a vehicle where the differential is to be disposed in the power path between a driving engine 12 and a pair of change speed transmissions 13A and 13B. Transmission 13A delivers drive to a left drive wheel 14A of the vehicle while transmission 13B transmits drive to a right drive wheel 14B. Dual power shift transmissions arranged in this manner are often employed in large vehicles, such as earthmoving equipment, to drive opposite side wheels and suitable constructions for the vehicle as a whole including the engine 12 and transmissions 13 are known to the art.

Differential mechanism 11 has an input shaft 16, driven by engine 12, which extends through a fluid coupling 17, an opening 18 in a housing member 19 and into a planetary gear set 21, the fluid coupling and planetary gear set being disposed coaxially with respect to the input shaft. Within gear set 21, an annular planet carrier 22 is disposed in coaxial relationship with the input shaft 16 and is coupled to the input shaft for rotation therewith by splines 23. Carrier 22 is supported at the back end by a bearing 24 which is in turn supported in an annular first output element 26. Carrier 22 has a front hub member 27 which extends forwardly through housing opening 18 and is journalled therein by another bearing 28. Carrier 22 supports a first set of planet gears 29 of which there are three in this example. Each such planet gear 29 is mounted on an associated one of three planet shafts 31 by means of bearings 32 and the planet gears are equi-angularly spaced around rotational axis of the carrier. The first planet gears 29 engage a first sun gear 33 disposed coaxially with respect to input shaft 16 and each such planet gear also engages a ring gear 34 on the forward end of first output element 26.

Three second planet gears 36 are supported by planet carrier 22, each such gear 36 being mounted on an individual one of an additional set of three planet shafts 37 by a bearing 38. Second planet gears 36 are situated more forwardly than first planet gears 29 but partially overlap the first planet gears 29 and as best seen in FIG. 2, each second planet gear 36 engages an associated individual one of the first planet gears 29. Referring now again to FIGS. 1 and 2 in conjunction, the second planet gears 36 engage with a second sun gear 39 disposed coaxially with respect to input shaft 16. Each of the second planet gears 36 also engages a second ring gear 41 at the forward end of a second annular output element 42. Second output element 42 is of slightly larger diameter than first output element 26 and is supported thereon through a bearing 43.

Equal diameter output gears 44 and 46 respectively are integrally formed on the back ends of output elements 26 and 42 respectively to transmit drive to transmissions 13B and 13A respectively through intermediate gears 47 and 48 respectively. It will be apparent that various other drive transmitting structures may be used between the differential mechanism 11 and transmissions 13 depending on the placement of the transmissions relative to the differential mechanism and on the configuration of the input members of the specific transmissions.

As will hereinafter be discussed in more detail in connection with the operation of the invention, the components described to this point provide for one of the two modes of operation in which the differential mechanism 11 provides an effect essentially similar to that of a conventional mechanical differential and in this mode of operation the fluid coupling 17 and sun gears 33 and 39 do not perform any significant role. However, to provide for the other mode of operation in which a highly efficient slip limiting function is superimposed on the standard differential action, sun gears 33 and 39 are connected to the fluid coupling 17 and means 50 are provided for selectively charging the fluid coupling.

In particular, first sun gear 33 has a sleeve extension 49 extending forward to fluid coupling 17. Sleeve extension 49 is coaxial with the input shaft 16 and is supported thereon at the forward end by a bearing 51. Fluid coupling 17 has an annular impeller member 52 disposed coaxially around the forward end of sun gear sleeve extension 49 and the impeller is coupled to the sun gear sleeve extension for rotation therewith through an annular hub 53 and splines 54.

The second sun gear 39 has a forwardly extending sleeve extension 56 disposed coaxially with respect to input shaft 16 and first sun gear sleeve extension 49. An annular runner member 57 of fluid coupling 17 is coupled to the forward end of sleeve extension 56 through a flange 58 at the front end thereof. A bearing 59 between the sleeve extensions 56 and 49 supports the runner member 57. To further support the impeller member 52 of the fluid coupling, an annular element 61 extends rearwardly therefrom around the runner member 57 and then extends radially inward to another bearing 62 disposed coaxially around the front end of planet carrier front hub member 27.

The internal components of fluid coupling 17 may be of essentially conventional construction, and thus the impeller member 52 and runner member 57 are shaped to jointly define a fluid chamber 63 in which oil or other suitable liquid may be admitted to cause torque to be hydrodynamically transferred between the impeller member and runner member. Fluid for this purpose maybe supplied from any suitable means but in order to allow for switching between the two modes of differential operation, such means must enable the selective filling or draining of chamber 63 of the fluid coupling. In this example such means 50 consists of a pump 64 drawing oil from a reservoir 66 and directing such fluid to a two position control valve 67. At one position, valve 67 transmits such fluid to an annular seal 68 disposed on the forward end of impeller member hub 53. A flow passage 69 extends from seal 68 through hub 53 and the adjacent portion of impeller member 52 to transmit the fluid to chamber 63 as the impeller member hub rotates within the stationary seal 68. Valve 67 has an alternate position at which seal 68 and thus passage 69 and fluid coupling chamber 63 is vented to the reservoir 66. With the valve in this alternate position, the output flow from pump 64 is returned directly to reservoir 66 through a relief valve 71.

The internal chamber 63 of fluid coupling 17 is not completely sealed as prolonged entrapment of oil in the chamber through centrifugal force would cause overheating of the oil and other undesirable effects. Thus, the fluid coupling has bleed passages 72 in the radially outermost part of annular element 61. Accordingly, when the valve 67 is shifted to the position at which the fluid coupling is to be charged with fluid, there is a continuous flow through the coupling as fluid is continually released through passages 72 and replaced by new fluid entering through passage 69. However, when the valve 67 is shifted to the above described alternate position, chamber 63 is rapidly emptied through bleed passages 72. Valve 67 may be manually operated by the vehicle operator or it may be linked to the vehicle transmission shift lever inasmuch as it is generally desirable to use the limited slip mode of operation in the lower vehicle speed ranges and the other mode of operation at higher vehicle speeds.

Considering now the operation of the differential mechanism 11 in the first mode under which fluid coupling 17 is drained and the differential effect resembles that of a conventional purely mechanical differential, it may be observed that planet carrier 22 is constrained to rotate with the input shaft 16 by splines 23. If at this time the loads on the two output gears 44 and 46 are equal, as is normally the case when the vehicle is travelling in a straight line on a level surface that provides good uniform traction to the drive wheels, then the two ring gears 34 and 41 exert equal resistances to orbiting of the two sets of planet gears 29 and 36 about the axis of rotation of the carrier 22. As the two sets of planet gears are engaed with each other these two forces cancel out at the planet gears and therefore, under the above described conditions, the planet gears do not rotate about their own axes. Under the above described conditions, the carrier 22 and the two output members 26 and 42 simply rotate in synchronism with the input shaft 16 and deliver equal torques at equal speeds to the two transmissions 13. If one wheel such as 14A is then forced to turn faster than the other, such as occurs in steering the vehicle around a curve, the associated ring gear 41 is accelerated relative to the other rotating components of the differential mechanism and this turns the associated set of planet gears 36 about their own axis. This rotates the other set of planet gears 29 in an opposite direction and therefore the speed of the other ring gear 34 is decreased by an amount proportional to the speed increase of ring gear 41. This provides a differential action essentially similar to what occurs in conventional purely mechanical differential mechanisms.

This is the mode of differential action which is usually preferable at high vehicle speeds on high traction surfaces. However, it is an undesirable mode of operation in certain situations which normally occur at low vehicle speeds. If one drive wheel loses traction, an excessive amount of torque is diverted to the slipping wheel while the torque delivered to the non-slipping wheel becomes undesirably low at a time when it should be high in order to propel the vehicle forward to regain full traction.

It may be observed that in the first mode of operation described above, fluid coupling 17 and sun gears 33 and 39 have no functional role. The two sun gears are effectively decoupled from each other and each may turn independently as might be necessary to accommodate to the above described motions of the other elements of the planetary gearing.

Under driving conditions where there is a risk of a prolonged loss of traction at one wheel, control valve 67 is shifted to fill fluid coupling 17 with oil. This superimposes a slip limiting effect upon the base differential action described above. Upon charging of the fluid coupling 17 the two sun gears are effectively coupled together through a means which resists but does not completely prohibit independent rotation of the two sun gears. Further, independent sun gear rotation is resisted to a degree which increases as a function of the difference of rotational speed of the two sun gears. Thus, in the second or limited slip mode of operation, operation of the mechanism remains essentially the same as described for the first mode as long as the speeds of the two drive wheels 14 and the loads which each wheel exerts against the transmission output members 26 and 42 remain equal. Under these conditions, ring gears 34 and 41 and planet carrier 22 revolve in synchronism with the input shaft 16. The two sets of planet gears 29 and 36 do not revolve about their own axes but instead orbit about the input shaft in synchronism with the rotation of the other planetary gearing elements. This orbiting motion causes both sun gears 33 and 39 and impeller member 52 and runner member 57 of the fluid coupling to also turn in synchronism with the input shaft.

If one drive wheel 14 should then be required to turn faster than the other, as in travel of the vehicle around a curve, the differential mechanism 11 accommodates to this fundamentally in the manner described above for the first mode of operation but the speed difference between the two wheels is increasingly resisted as a function of the magnitude of the speed difference. When the engaged sets of planet gears 29 and 36 start to revolve about their own axis, the rotational speed of one sun gear 33 or 39 is increased while that of the other sun gear is correspondingly decreased. This in turn forces the fluid coupling 17 to slip inasmuch as the rotational speed of one of the members 52 or 57 of the fluid coupling is increased while that of the other member of the coupling is correspondingly decreased. In accordance with the torque conversion effect of such fluid couplings 17, increased torque is applied to the decelerating one of the sun gears such torque being derived from the accelerating sun gear. This torque transfer between sun gears is transmitted through the planet gears to the output gears 44 and 46 of the differential mechanism and amounts to a feedback of torque from the higher speed output to the lower speed output. Further, this torque regeneration effect is proportional to the difference in speeds of the two outputs. Small differences in wheel speed are only lightly resisted while more pronounced differences in wheel speed are more strongly resisted. This highly desirable effect results from the fact that in a fluid coupling 17 the amount of torque transferred between the rotating members 52 and 57 increases as the speed differences between the two members increases.

The diameter of sun gears 33 and 39 is preferably substantially smaller than the diameter of ring gears 34 and 41 as torque amplification in fluid coupling 17 is increased in proportion to this difference of gear diameters. Consequently, the size of fluid coupling 17 may be minimized by increasing this gear diameter ratio to the extent possible.

The embodiment of the invention described with reference to FIGS. 1 and 2 was adapted for use in a vehicle where separate transmissions 13 are utilized at each of two drive wheels and wherein the differential mechanism is situated in the power path between the engine and the two transmissions. The basic structure of the invention may be adapted to other types of vehicles as well. Referring now to FIG. 3, there is shown a modification of the differential mechanism 11' adapted for use in the more common form of vehicle wherein the differential mechanism is situated in coaxial relationship with two vehicle drive wheels 14A' and 14B' and wherein drive from an engine 12' is transmitted to the differential mechanism through a single transmission 13'.

Differential mechanism 11' may have a housing 19', a fluid coupling 17' and a planetary gearing section 21' essentially similar to the corresponding components of the previously described embodiment except as will be hereinafter described. Thus, fluid coupling 17' has an impeller member 52' and a runner member 57' coupled to first and second sun gears 33' and 39' respectively through sun gear sleeve extensions 49' and 56' respectively. Planetary gearing section 21' may have a rotatable planet carrier 22' carrying a first set of planet gears 29' which engage with sun gear 33' and a second set of planet gears 36' which engage sun gear 39' wherein each planet gear 29' is also engaged with a corresponding individual one of the planet gears 36' as previously described. First planet gears 29' also engage a ring gear 34' formed on a first output member 26' while the second planet gears 36' engage a ring gear 41' of a second output element 42'.

Considering now modifications in the differential mechanism 11' of FIG. 3 relative to that of FIG. 1, the centermost shaft 16' which extends along the axis of the fluid coupling and planetary gearing system does not function as a drive input but is instead an extension of the axle of one of the vehicle drive wheels 14A' and has a flange 73' secured to the first output member 26', by means such as bolts 74, for rotation therewith. Thus, shaft 16' couples one drive wheel to one output of the differential mechanism. The other drive wheel 14B' is coupled to the other output member 42' of the differential mechanism through a shaft-like extension 76 extending from output member 42' in coaxial relationship to shaft 16' to form an axle for the other drive wheel 14B'.

The shaft 77 through which drive is received from transmission 13' extends at right angles to the rotational axis of the differential mechanism 11' in this form of vehicle and to transfer drive to the planet carrier 22', a first bevel gear 78 is disposed at the end of shaft 77. Gear 78 engages a second bevel gear 79 which is formed integrally on planet carrier hub member 27'.

Accordingly, the embodiment of the invention depicted in FIG. 3 differs from that previously described primarily in that different input means 78, 79 and 27' are utilized to transmit drive to the planet carrier 22' while modified output means 16', 76 transmit drive from the output members 26' and 42' to the drive wheels 14. Aside from these modifications the operation of the differential mechanism 11' of FIG. 3 is similar to that previously set forth with reference to the first described embodiment. In particular, if fluid coupling 17' is drained of fluid, the planetary gearing assembly 21' provides a differential action essentially similar to that realized with a conventional purely mechanical differential. With fluid coupling 17' charged with fluid, a torque regenerative action is superimposed upon the basic differential mechanism to provide a slip limiting action in which any speed differential between the two wheels 14 is incresingly resisted in proportion to the magnitude of the speed differential and in which a loss of traction at one wheel results in a high torque being applied to the other wheel.

While the invention has been described with respect to certain exemplary embodiments, it will be apparent that many modifications are possible and it is not intended to limit the invention except as defined by the following claims.

What is claimed is:

1. Differential mechanism for transmitting drive from an input element to first and second output elements comprising:
    a planetary gearset having first and second sun gears and first and second ring gears and having a planet carrier supporting at least one first planet gear in engagement with said first sun gear and said first ring gear and supporting at least one second planet gear in engagement with said second sun gear and said second ring gear, said first and second planet gears being engaged with each other,
    means for coupling said planet carrier to said input element for rotation therewith, means for coupling said first output element to said first ring gear for rotation therewith, means for coupling said second output element to said second ring gear for rotation therewith, and
    a fluid drive means having an impeller member coupled to one of said sun gears and having a runner member coupled to the other thereof.

2. Differential mechanisms as defined in claim 1 further comprising control means for selectively filling said fluid drive means with fluid and for selectively emptying fluid therefrom to selectively couple and decouple said sun gears.

3. Differential mechanism as defined in claim 2 wherein said control means comprises a source of fluid and a valve connected between said fluid source and said fluid drive means, said valve having an open position at which a flow of fluid is continuously supplied to said fluid drive means and having another position at which said flow is stopped, said fluid drive means having a drain passage in a radially outward region thereof whereby said fluid drive means is emptied when said flow is stopped by said valve.

4. Differential mechanism as defined in claim 1 wherein said fluid drive means and said gears and ring gears and said planet carrier are disposed for rotation about a single axis of rotation, further comprising first and second rotatable sleeve means extending coaxially from said first and second sun gears respectively and being coupled to separate ones of said members of said fluid drive means for rotation therewith.

5. Differential mechanism as defined in claim 4 wherein said first and second output elements are disposed for rotation about said axis and wherein said means coupling said first output element to said first ring gear comprises a first output sleeve means extending coaxially therebetween, and wherein said means coupling said second output element to said second ring gear comprises a second output sleeve means extending coaxially therebetween and in coaxial relationship to said first output sleeve means.

6. Differential mechanism as defined in claim 4 wherein said first and second ring gears are spaced apart along said axis and wherein said first planet gear extends from said first ring gear towards said second ring gear and said second planet gear extends from said second ring gear towards said first ring gear and overlaps said first planet gear, said planet gears being engaged with each other at the overlapping portions thereof.

7. Differential mechanism as defined in claim 4 wherein said input element is a shaft extending along said axis of rotation and said output elements are gears disposed in coaxial relationship therewith.

8. Differential mechanism as defined in claim 4 wherein said input element is a bevel gear disposed coaxially with respect to said planet carrier and said output elements are shafts extending in opposite directions along said axis of rotation.

* * * * *